(12) United States Patent
Liu et al.

(10) Patent No.: US 9,863,838 B2
(45) Date of Patent: Jan. 9, 2018

(54) AIR TIGHTNESS DETECTION DEVICE FOR ALUMINUM ALLOY WHEEL HUB AND METHOD FOR DETECTING AIR TIGHTNESS OF WHEEL HUB

(71) Applicant: CITIC Dicastal CO., LTD, Qinhuangdao (CN)

(72) Inventors: Chunhai Liu, Qinhuangdao (CN); Zhigao Yin, Qinhuangdao (CN); Debin Tang, Qinhuangdao (CN); Jinqi Lv, Qinhuangdao (CN); Zhipeng Li, Qinhuangdao (CN); Aiguo Zhang, Qinhuangdao (CN); Zhihua Zhu, Qinhuangdao (CN); Yongning Wang, Qinhuangdao (CN); Changhai Li, Qinhuangdao (CN)

(73) Assignee: CITIC Dicastal CO., LTD, Qinhuangdao (CN)

( * ) Notice: Subject to any disclaimer, the term of this patent is extended or adjusted under 35 U.S.C. 154(b) by 28 days.

(21) Appl. No.: 15/002,061

(22) Filed: Jan. 20, 2016

(65) Prior Publication Data
US 2016/0223425 A1 Aug. 4, 2016

(30) Foreign Application Priority Data
Feb. 3, 2015 (CN) .......................... 2015 1 0055661

(51) Int. Cl.
*G01M 3/22* (2006.01)
*G01M 3/32* (2006.01)

(52) U.S. Cl.
CPC .................. *G01M 3/329* (2013.01)

(58) Field of Classification Search
CPC ................ G01M 3/329; G01M 3/22

USPC ............................................. 73/40
See application file for complete search history.

(56) References Cited

U.S. PATENT DOCUMENTS

| | | | | |
|---|---|---|---|---|
| 3,039,294 A * | 6/1962 | Inman | ................ | G01M 3/3209 73/45.1 |
| 3,266,296 A * | 8/1966 | Hall | ........................ | G01M 3/24 29/894.3 |
| 3,389,811 A * | 6/1968 | Frank | .................... | B07C 5/3404 101/40 |

(Continued)

FOREIGN PATENT DOCUMENTS

CN 101344451 A * 1/2009

OTHER PUBLICATIONS

English Translation of CN 101344451, Accessed May 11, 2017.*

*Primary Examiner* — Peter Macchiarolo
*Assistant Examiner* — Alexander Mercado
(74) *Attorney, Agent, or Firm* — Maier & Maier, PLLC

(57) ABSTRACT

The present invention provides an air tightness detection device for an aluminum alloy wheel hub, which is characterized by precision air pressure sensors, a lower clamp, a cone cylinder pressure plate, air pipes, a pressure plate, guide posts, an air inlet pipe, and a compressed gas control and detection system. A technical solution of the present invention has the following advantages that the cone cylinder pressure plate of the detection device reduces the space of an inner cavity of the wheel hub to further reduce inflating volume, thereby increasing detection efficiency; the characteristics of readily availability for preparation, no pollution and low cost are achieved by taking compressed air as a leakage indication gas.

8 Claims, 2 Drawing Sheets

(56) References Cited

U.S. PATENT DOCUMENTS

| | | | | |
|---|---|---|---|---|
| 3,390,569 A * | 7/1968 | McMeekin | G01M 3/3236 | 209/526 |
| 3,461,716 A * | 8/1969 | Thomson | B07C 5/3404 | 209/591 |
| 3,649,096 A * | 3/1972 | Clark | G21H 5/02 | 250/303 |
| 3,824,840 A * | 7/1974 | Amberg | G01M 3/3218 | 73/45.3 |
| 3,987,664 A * | 10/1976 | Hass | G01M 3/3281 | 73/49.2 |
| 4,045,996 A * | 9/1977 | Sopcak | G01M 3/007 | 73/1.04 |
| 4,575,807 A * | 3/1986 | Dodge | G01M 3/26 | 340/605 |
| 4,754,638 A * | 7/1988 | Brayman | G01M 3/205 | 73/40.7 |
| 4,776,209 A * | 10/1988 | Patchel | G01M 3/103 | 73/45.5 |
| 4,813,268 A * | 3/1989 | Helvey | G01M 3/205 | 73/40.7 |
| 4,852,390 A * | 8/1989 | Fisch | G01M 3/24 | 73/40.5 A |
| 4,991,426 A * | 2/1991 | Evans | G01M 3/24 | 73/1.05 |
| 5,010,761 A * | 4/1991 | Cohen | G01M 3/229 | 73/40.7 |
| 5,018,381 A * | 5/1991 | Campos | G01M 3/06 | 73/45.5 |
| 5,267,468 A * | 12/1993 | Zoccoletti | G01M 3/26 | 73/40 |
| 5,850,036 A * | 12/1998 | Giromini | G01M 3/226 | 198/340 |
| 6,330,821 B1 * | 12/2001 | Arnold | G01M 3/227 | 73/40 |
| 6,330,822 B1 * | 12/2001 | Hawk | G01M 3/20 | 73/40 |
| 6,332,350 B1 * | 12/2001 | Inoue | G01M 3/20 | 73/40 |
| 2004/0011117 A1 * | 1/2004 | Dutt | G01M 17/024 | 73/48 |
| 2006/0037382 A1 * | 2/2006 | Falchi | B29D 30/0662 | 73/40 |
| 2012/0304723 A1 * | 12/2012 | Abe | B21D 22/02 | 72/68 |
| 2015/0276542 A1 * | 10/2015 | Bowen | G01M 17/021 | 73/45.6 |
| 2016/0368332 A1 * | 12/2016 | Liu | B60C 23/04 | |

* cited by examiner

AIR TIGHTNESS DETECTION DEVICE FOR ALUMINUM ALLOY WHEEL HUB AND METHOD FOR DETECTING AIR TIGHTNESS OF WHEEL HUB

TECHNICAL FIELD

The present invention relates to the field of automobile parts, and in particular to air tightness detection device for an aluminum alloy wheel hub and a method for detecting the air tightness of the wheel hub.

BACKGROUND ART

The air tightness of an aluminum alloy wheel hub is an important index for measuring the performance of the aluminum alloy wheel hub. In wheel hub manufacturing enterprises, every aluminum alloy wheel hub must be inspected on the conformity with an air tightness requirement.

Common detection methods adopted include a helium gas-tightness detection method and a water air-tightness detection method. When a helium gas is adopted for detection, an inert gas of helium gas and a helium mass spectrometer need to be used. The detection equipment are expensive and the consumption of helium gas is large, leading to high overall cost. The principle for the helium gas-tightness detection is that a wheel hub needs to be placed in an air-tight space during detection; an inner cavity of the wheel hub is vacuumized; when a vacuum value is small enough, a helium gas with a certain pressure value is filled to the outer side of the wheel hub; if a leaking point exists in the wheel hub rim, molecules of the helium gas will pass through the leaking point to reach the inner cavity of the wheel hub; since the inner cavity of the wheel hub is in a vacuum environment, the molecules of the helium gas will be extracted into the helium mass spectrometer, which detects the number of helium molecules, thereby determining whether the air tightness of the wheel hub is within an acceptable range.

The principle of the water air-tightness detection is that inner and outer sides of the wheel hub are closed during detection; the wheel hub is immersed into water; then the inner cavity of the wheel hub is inflated with compressed air under certain pressure; and if an obvious leaking point exists in the wheel hub, high-pressure air in the inner cavity will form air bubbles in the water; and whether the air tightness of the wheel hub is acceptable can be further determined. Regarding the water air-tightness detection, water quality becomes worse after long-term continuous detection and needs to be changed, which consumes a large amount of clean water; in addition, a detection process needs to be observed by human eyes, which easily results in missed determination, and moreover, the detection time is long and the overall efficiency is low.

It follows that the traditional detection methods have the following defects that 1. with the helium gas, the equipment investment is large and the consumption of helium gas is high, leading to high overall cost; 2. with water air-tightness detection, a large amount of clean water needs to be consumed, with the detection time being long and the overall cost being high; therefore, the air tightness detection to the aluminum alloy wheel hub is in need of improvement.

SUMMARY OF THE INVENTION

Therefore, an object of the present invention is to provide an air tightness detection device for an aluminum alloy wheel hub, which is high in accuracy, simple in structure, easy for manufacturing and easy to popularize and apply, and a method for detecting the air tightness of the aluminum alloy wheel hub.

In order to achieve the object as described above, the present invention provides a technical solution as follows.

In one aspect of the present invention, an air tightness detection device for an aluminum alloy wheel hub is provided, which is characterize by comprising precision air pressure sensors 3, a lower clamp 4, a cone cylinder pressure plate 5, air pipes 6, a pressure plate 8, guide posts 10, an air inlet pipe 11, and a compressed gas control and detection system 12, wherein (1) the pressure plate 8 is connected to the guide posts 10 and is composed of soft rubber; (2) the cone cylinder pressure plate 5 is mounted on the lower clamp 4 and is a cylindrical soft rubber part, with a dimension smaller than that of an inner cavity of the wheel hub; (3) the cone cylinder pressure plate 5 is internally provided with the air inlet pipe 11, with one end communicated to a surface of the cone cylinder pressure plate 5 and the other end communicated to the compressed gas control and detection system 12; and (4) the cone cylinder pressure plate 5 is internally provided with the air pipes 6, with one end communicated to a surface of the cone cylinder pressure plate 5 and the other end communicated to the precision air pressure sensors 3; preferably, the cone cylinder pressure plate 5 is mounted on a base 2 through the lower clamp 4.

In one preferable aspect of the present invention, the cone cylinder pressure plate 5 occupies 85% to 97% of the space of the inner cavity of a wheel hub 7; and preferably, the cone cylinder pressure plate 5 occupies 90% to 94% of the space of the inner cavity of the wheel hub 7.

In one preferable aspect of the present invention, the device further comprises leveling screws 1 mounted on a bottom surface of the base 2 for ensuring vertical and contact between the base 2 and ground; preferably, the device comprises four leveling ground screws 1.

In one preferable aspect of the present invention, the precision air pressure sensors 3 and the air pipes 6 are respectively 3 to 12 in number and are uniformly distributed along a circumferential direction; preferably, the precision air pressure sensors 3 and the air pipes 6 of the device are respectively 6 in number and are uniformly distributed along the circumferential direction.

In one preferable aspect of the present invention, the pressure plate 8 is mounted on the guide posts 10 through an upper clamp 9; preferably, the guide posts are 2 to 4 in number, and most preferably 2.

In one preferable aspect of the present invention, the device further comprises a loading lead screw 14, with one end mounted on the upper clamp 9 and the other end mounted on a fixed cross beam 15 and mechanically connected with a servo motor and reduction gear 16.

In one preferable aspect of the present invention, the compressed gas servo control and detection system 12 is a flow type or pressure type compressed gas servo control and detection system; preferably, the compressed gas servo control and detection system 12 is connected with a servo motor loading control system 13.

In another aspect of the present invention, a system for detecting air tightness of an aluminum alloy wheel hub is provided, which is characterized by comprising the forgoing air tightness detection device for the aluminum alloy wheel hub, a data acquisition module 101 and a data processing module 102, wherein the data acquisition module 101 reads gas pressure measurement data from the precision air pressure sensors 3, and the data processing module 102 is connected with the data acquisition module 101 and the servo motor loading control system 13; the data processing module 102 comprises a processor and a memory and is connected with the data acquisition module; the data processing module 102 is configured to (a) read the gas pressure measurement data from the data acquisition module 101 and record the gas pressure measurement data in the memory; and (b) send an inflation or inflation stopping instruction to the servo motor loading control system 13; preferably, the system further comprises a manipulator 103 connected to the data processing module 102, with the manipulator 103 set to (a) move the wheel hub onto the cone cylinder pressure plate 5, and (b) move the wheel hub from the cone cylinder pressure plate 5 to a scrap area, or (c) move the wheel hub from the cone cylinder pressure plate 5 to a qualified product area, according to the instruction sent by the data processing module 102.

In another aspect of the present invention, a method for detecting air tightness of an aluminum alloy wheel hub by using the foregoing device or the foregoing system is provided, which is characterized by comprising the following steps: (1) placing a wheel hub to be detected on the cone cylinder pressure plate 5, with a spoke side up, and moving the pressure plate 8 downwards to press a wheel disk of the wheel hub tightly; (2) filling a compressed gas into the air inlet pipe 11 through the compressed gas control and detection system 12, and detecting a gas pressure by using the precision air pressure sensors 3 till the precision air pressure sensors 3 detect that the gas pressure reaches a first pressure, with the first pressure being 200 to 800 kPa and an inflation time being 2 to 12 seconds; (3) stopping inflation, detecting the gas pressure through the precision air pressure sensors 3, and recording a second gas pressure after 10 to 60 seconds; and (4) comparing the second gas pressure with the first gas pressure to obtain an air tightness index of the wheel hub; preferably, the first gas pressure is 600 to 700 kPa, and the inflation time is 4 to 7 seconds.

In another aspect of the present invention, a method for detecting air tightness of an aluminum alloy wheel hub by using the foregoing device or the foregoing system is provided, which comprises the following steps: (1) placing a wheel hub to be detected on the cone cylinder pressure plate 5, with a spoke side up, and moving the pressure plate 8 downwards to press a wheel disk of the wheel hub tightly; (2) filling a compressed gas into the air inlet pipe 11 through the compressed gas control and detection system 12, and detecting a gas pressure by using the precision air pressure sensors 3 till the precision air pressure sensors 3 detect that the gas pressure reaches a first pressure, with the first pressure being 200 to 800 kPa and an inflation time being 2 to 12 seconds; (3) filling a compressed gas into the air inlet pipe 11 through the compressed gas control and detection system 12, detecting a gas pressure by using the precision air pressure sensors 3, with an inflation flow of 5-58 Pa*mL/s and duration of 10 to 20 seconds, and measuring a second gas pressure through the precision air pressure sensors 3 at the end of the step; (4) comparing the first gas pressure with the second gas pressure to obtain an air tightness index of the wheel hub; preferably, in the step (1), the first gas pressure is 600 to 700 kPa and the inflation time is 4 to 7 seconds, and in the step (3), the inflation flow is 15-25 Pa*mL/s.

In other aspects of the present invention, an embodiment is also provided as follows:

In one aspect of the present invention, air tightness detection equipment for an aluminum alloy wheel hub is provided, which is characterized by comprising leveling ground screws 1, a base 2, precision air pressure sensors 3, a lower clamp 4, a cone cylinder pressure plate 5, an air pipe 6, an aluminum alloy wheel hub 7, a pressure plate 8, an upper clamp 9, guide posts 10, an air inlet pipe 11, a compressed air control and detection system 12, a servo motor loading control system 13, a loading lead screw 14, a fixed crossed beam 15, and a servo motor and reduction gear 16, wherein the leveling screws 1 are mounted on a bottom face of the base 2 for ensuring vertical and contact between the base 2 and ground; the base 2 is provided with 6 precision air pressure sensors 3 and the air inlet pipe 11; the base 2 is provided with the lower clamp 4; the lower clamp 4 is provided with the cone cylinder pressure plate 5, in the middle of which is provided with one air inlet pipe 11 and six air pipes 6 distributed along a circumferential direction uniformly, and the cone cylinder pressure plate 5 is made of a soft rubber material to play a major role of sealing; the wheel hub 7 is mounted above the cone cylinder pressure plate 5; the pressure plate 8 is mounted on the upper clamp 9 and is made of a soft rubber material to play a major role of sealing; the upper clamp 9 is provided with the guide posts 10 and the loading lead screw 14 through threaded connection; the fixed cross beam 15 is provided with the servo motor and reduction gear 16 and the guide posts 10; the compressed air servo control and detection system 12 and the servo motor loading control system 13 are mounted in a control box.

In one preferable aspect of the present invention, the device comprises four leveling ground screws 1.

In one preferable aspect of the present invention, the cone cylinder pressure plate 5 is adopted and is internally provided with six air pipes 6 in uniform distribution for collecting a gas pressure of the inner cavity of the wheel hub 7; and in addition, the cone cylinder pressure plate 5 occupies more than 90% of space of the inner cavity of the wheel hub 7, thereby greatly reducing the inflation amount of the compressed air, reducing inflation time and improving detection efficiency.

In one preferable aspect of the present invention, the compressed air servo control and detection system 12 can work in two manners, i.e. a flow manner and a pressure manner.

In one preferable aspect of the present invention, the precision air pressure sensors 3 are adopted so that a pressure change condition in the inner cavity of the wheel hub 7 can be shown accurately.

In one preferable aspect of the present invention, the servo motor loading control system 13 is adopted so that the outer-side sealing of the pressure plate 8 and the wheel hub 7 can be realized rapidly, and a sealing pressure is large enough.

In one preferable aspect of the present invention, two guide posts 10 are adopted so that the stable operation of the loading lead screw 14 can be guaranteed.

In one preferable aspect of the present invention, an intermediate loading manner of the loading lead screw 14 is adopted to guarantee uniform loading distribution so that the sealing force of the pressure plate 8 is large enough.

The present invention discloses air tightness detection equipment for an aluminum alloy wheel hub and a detection method thereof, which is characterized in that the air tightness detection equipment comprises leveling ground screws 1, a base 2, precision air pressure sensors 3, a lower clamp 4, a cone cylinder pressure plate 5, air pipes 6, an aluminum alloy wheel hub 7, a pressure plate 8, an upper clamp 9, guide posts 10, an air inlet pipe 11, a compressed air servo control and detection system 12, a servo motor loading control system 13, a loading lead screw 14, a fixed crossed beam 15, and a servo motor and reduction gear 16. The air tightness detection equipment has the following advantages that (1) a support seat and a loading force value are ensured to keep vertical to the ground through the leveling ground screws to ensure an accurate and reliable detection process; (2) the compressed air servo control and detection system can realize two detection manners, i.e. a pressure difference manner and a flow manner; (3) the stable and reliable sealing and rapid and stable action can be ensured for the wheel hub during detection by adopting the servo motor loading control system; (4) the cone cylinder pressure plate is internally provided with the air pipes along a circumferential direction in a uniform distribution manner and the air pipes are connected with the precision air pressure sensors, so that the accuracy and rapidness in pressure detection are improved; and (5) the equipment has the characteristics of accuracy and reliability in detection, simple and reasonable structure, light weight, easiness for installation and regulation, and has the advantages of high detection efficiency, energy-saving and environment-friendly properties, low overall manufacturing cost and operating cost.

The technical solution of the present invention has the following advantages that: (1) the cone cylinder pressure plate of the detection device reduces an inner cavity space of a wheel hub to further reduce inflating volume, thereby increasing detection efficiency; (2) the characteristics of readily availability for preparation, no pollution and low cost are achieved by taking compressed air as a leakage indication gas; (3) the inflation detection efficiency and control stability are increased by adopting an air pressure servo control system; (4) with adoption of a servo motor loading control system, the action stability is increased and the advantage of rapidness and stability are achieved; in addition, a larger loading force can be provided to ensure good sealing performance; (5) the air tightness of a wheel hub can be determined rapidly and accurately by adopting the precision air pressure sensors as detection elements.

BRIEF DESCRIPTION OF DRAWINGS

In the following, embodiments of the present invention are illustrated in detail in combination with the drawings, wherein.

Figure 1:
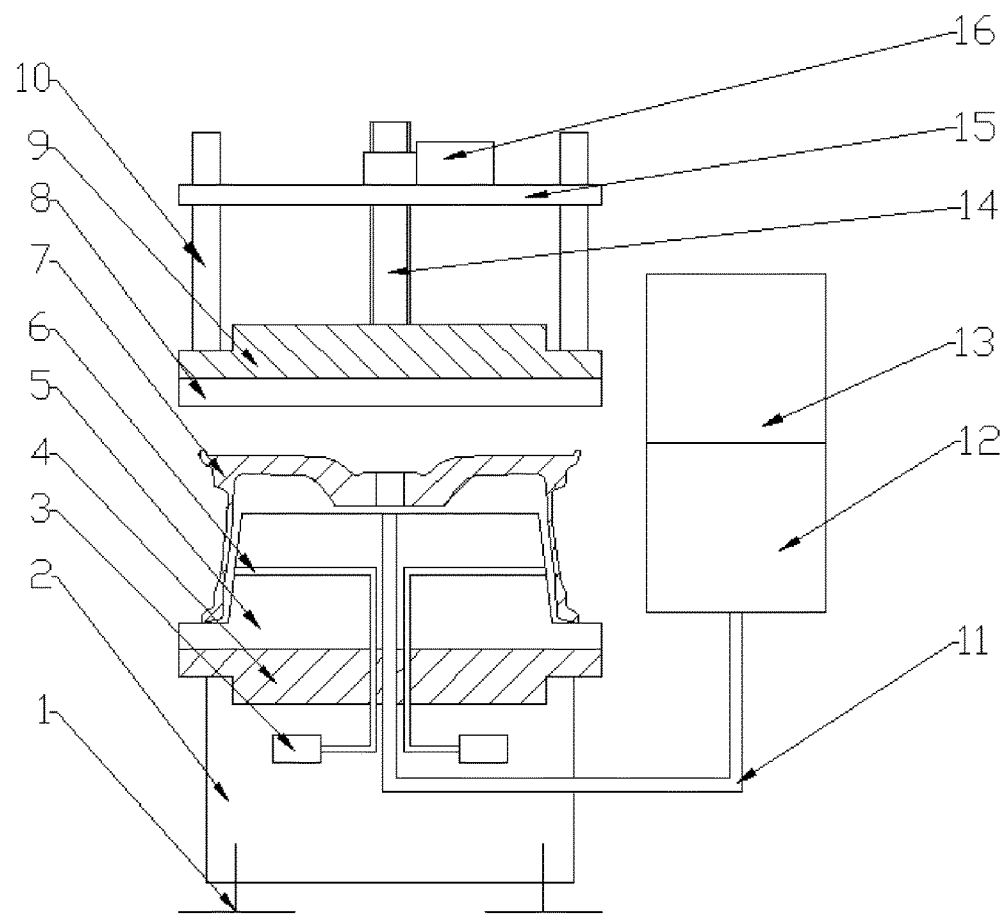
FIG. 1 is a schematic diagram of a structure of an air tightness detection device for an aluminum alloy wheel hub.
Figure 2:
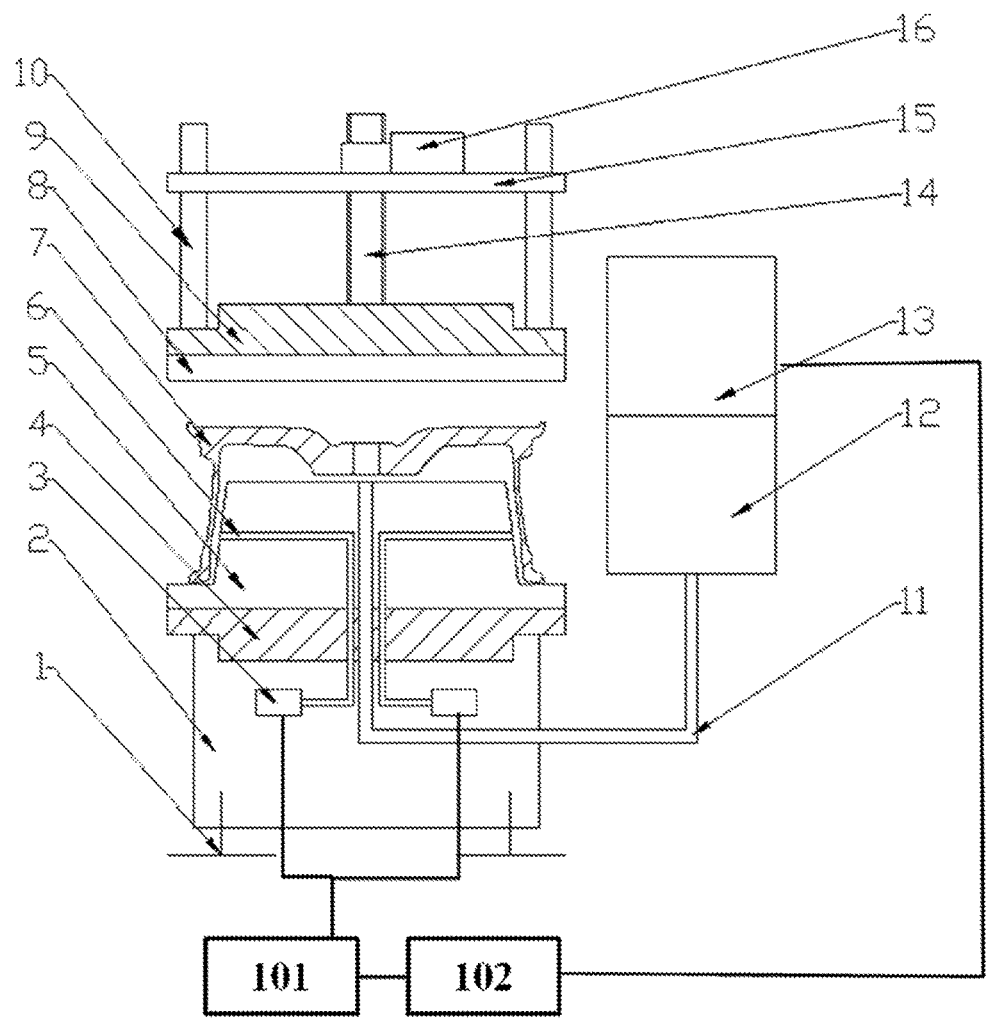
FIG. 2 is a schematic diagram of a system for detecting air tightness of an aluminum alloy wheel hub.

wherein 1—leveling ground screw, 2—base, 3—precision air pressure sensor, 4—lower clamp, 5—cone cylinder pressure plate, 6—air pipe, 7—aluminum alloy wheel hub, 8—pressure plate, 9—upper clamp, 10—guide post, 11—suspended air inlet pipe, 12—compressed air servo control and detection system, 13—servo motor loading control system, 14—loading lead screw, 15—fixed cross beam, and 16—servo motor and reduction gear.

DETAILED DESCRIPTION OF THE INVENTION

Embodiment 1: Air Tightness Detection Device for Aluminum Alloy Wheel Hub

In the following, the air tightness detection device for the aluminum alloy wheel hub is illustrated in detail in combination with the drawings.

The air tightness detection device for the aluminum alloy wheel hub comprises leveling ground screws 1, a base 2, precision air pressure sensors 3, a lower clamp 4, a cone cylinder pressure plate 5, air pipes 6, an aluminum alloy wheel hub 7, a pressure plate 8, an upper clamp 9, guide posts 10, an air inlet pipe 11, a compressed air control and detection system 12, a servo motor loading control system 13, a loading lead screw 14, a fixed crossed beam 15, and a servo motor and reduction gear 16.

The base 2 is kept vertical to the ground through the leveling ground screws 1 and is in stable contact with the ground; the base 2 is provided with six precision air pressure sensors 3 and one air inlet pipe 11, and the six precision air pressure sensors are respectively connected with the six air pipes; the lower clamp 4 is mounted on the base 2, and the cone cylinder pressure plate 5 is mounted on the lower clamp 4; the wheel hub 7 is placed on the cone cylinder pressure plate 5.

The pressure plate 8 is mounted on the upper clamp 9 and the upper clamp 9 is connected with two guide posts 10 and one loading lead screw 14.

The other ends of the guide posts 10 and the loading lead screw 14 are connected with the fixed cross beam 15 to form a sliding pair and a thread pair respectively; and the fixed cross beam 15 is provided with the servo motor and reduction gear 16.

The compressed air servo control and detection system 12 and the servo motor loading control system 13 are mounted in a control box; and the air inlet pipe 11 is connected with the compressed air servo control and detection system 12.

Embodiment 2: Method 1 for Detecting Air Tightness of Aluminum Alloy Wheel Hub-Pressure Difference Method As described in Embodiment 1, after the installation of the detection device for the aluminum alloy wheel hub is completed, the wheel hub 7 is placed on the cone cylinder pressure plate 5; the servo motor loading control system 13 controls the servo motor and reduction gear 16 to work; the loading lead screw 14 drives the upper clamp and the pressure plate 8 to move downwards to be in tight press fit with the upper surface of the wheel hub 7, and the sealing process lasts for about 3 seconds.

Then, the compressed air servo control and detection system 12 fills compressed air with a pressure value of 600 KPa into the sealed inner cavity of the wheel hub 7 through the air inlet pipe 11, and since more than 90% of the inner cavity of the wheel hub 7 is occupied by the cone cylinder pressure plate 5, the inflation process only lasts for 3 to 5 seconds and then can be completed.

When the six air pipes 6 in uniform distribution along a circumferential direction are inflated with air, the precision air pressure sensors 3 will detect pressure values of the inner cavity of the wheel hub, at the point, if all the pressures detected by the six precision air pressure sensors 3 reach a range of 600 KPa to 599.9 KPa, the compressed air servo control and detection system 12 will stop inflation and keep the pressure value constant, and this process can be completed only in 1 to 3 seconds, and then advances to a pressure maintaining and leakage measuring stage.

In the pressure maintaining and leakage measuring stage, a maintaining time is set to be 10 seconds and 20 seconds. If one precision air pressure sensor 3 detects that the pressure value exceeds the set range (the set range is 600 KPa to 599.9 Kpa in case of 10 seconds of maintaining time, and 600 KPa to 599.8 KPa in case of 20 seconds of maintaining time), the wheel hub 7 can be determined to undergo leakage; or else, the wheel hub 7 can be determined to be a qualified product.

From the detection method as described above, it can be obtained that the whole detection can be completed within 17 to 31 seconds, the detection efficiency is greatly improved as compared with that of the traditional detection methods, in addition, the detection results are accurate and reliable and the detection cost is very low.

The method of the present embodiment is used to detect a test group of 1000 wheel hubs to be tested, and the results show that 22 wheel hubs are unqualified in terms of air tightness. After the above 22 wheel hubs are marked, a helium gas method and a water air tightness method are used for detection, and the results show that for the 22 unqualified wheel hubs detected by the method of the present embodiment, 21 wheel hubs are shown to be unqualified with the helium gas method, and 20 with the water air tightness method. All the 983 wheel hubs detected to be qualified with the method of the present embodiment are shown to be qualified in the cases of the helium gas method and the water air tightness method. This indicates that the method of the present embodiment is higher in accuracy and can replace the traditional methods for use.

The inventors also find that a parameter (a ratio of a pressure difference to an initial pressure) representing the air tightness of the wheel hub can be obtained by using the method of the present embodiment. For approximate initial pressure values, the smaller the parameter is, the better the air tightness of the wheel hub is. This indicates that the qualified wheel hubs can be subjected to further quality classification according to the method of the present embodiment. This will greatly facilitate the quality-based grading of the wheel hubs, and the discriminated selling specific to the quality requirement for the wheel hubs will facilitate the increase of the average selling price of the wheel hubs. For fewer occasions in which the requirement on the air tightness of the wheel hub is extremely high, the wheel hub can be selected in a targeted way, thereby improving the safety coefficient in such occasions and bringing significant effects.

In the present embodiment, in view of the larger volume of the inner cavity of the wheel hub and the possible 360° leaking point uncertainty, the inner cavity of the wheel hub is spatially divided into six small spaces or more (such as 12 small spaces), thus the pressure change within each small space can be monitored more easily. The use of six gas pressure sensors to divide six equal parts is based on the full consideration of the data acquisition capability of the hardware and the data processing capability of a control system. If more spaces are divided, the data processing rate will be lower according to the present condition. Therefore, the final selection of six gas pressure sensors is based on a result obtained by balancing and optimizing the two factors.

Embodiment 3: Method 2 for Detecting Air Tightness of Aluminum Alloy Wheel Hub-Flow Method As described in Embodiment 1, after the installation of the detection device for the aluminum alloy wheel hub is completed, the wheel hub 7 is placed on the cone cylinder pressure plate 5; the servo motor loading control system 13 controls the servo motor and reduction gear 16 to work; the loading lead screw 14 drives the upper clamp and the pressure plate 8 to move downwards to be in tight press fit with the upper surface of the wheel hub 7; the sealing process lasts for about 3 seconds.

Then, the compressed gas control and detection system 12 fills compressed air with a pressure value of 600 KPa into the sealed inner cavity of the wheel hub 7 through the air inlet pipe 11; since more than 90% of the inner cavity of the wheel hub 7 is occupied by the cone cylinder pressure plate 5, the inflation process only lasts for 3 to 5 seconds and then can be completed.

When the six air pipes 6 in uniform distribution along a circumferential direction are inflated with air, the precision air pressure sensors 3 will detect a pressure vale of an inner cavity of the wheel hub; at the point, if all the pressures detected by the six precision air pressure sensors 3 reach a range of 600 KPa to 599.9 KPa, the compressed air control and detection system 12 will maintain a certain inflation flow in Pa*ml/s (e.g., the flow value of 10 Pa*ml/s) and keep the flow value constant, and this process will last for 10 to 20 seconds, and then advances to a flow leakage-measuring stage.

The precision air pressure sensors 3 detect pressure value change quantities $\Delta P$ of corresponding areas of the inner cavity of the wheel hub and convert the pressure value change quantities into flow values. Through comparison, if the flow value of an area is less than the flow value for maintaining the constant condition (10±0.02 Pa*ml/s), the wheel hub 7 can be determined to undergo leakage; or else, the wheel hub 7 can be determined to be qualified.

The method of the present embodiment is used to detect a test group of 1000 wheel hubs to be tested, and the results show that 17 wheel hubs are unqualified in terms of air tightness. After the above 17 wheel hubs are marked, a helium gas method and a water air tightness method are used for detection; the results show that for the 17 unqualified wheel hubs detected by the method of the present embodiment, 16 wheel hubs are shown to be unqualified with the helium gas method, and 15 with the water air tightness method. All the 983 wheel hubs detected to be qualified with the method of the present embodiment are shown to be qualified in the cases of the helium gas method and the water air tightness method. This indicates that the method of the present embodiment is higher in accuracy and can replace the traditional methods for use.

The inventors also find that a parameter (a ratio of a pressure difference to an initial pressure) representing the air tightness of the wheel hub can be obtained by using the method of the present embodiment. For approximate initial pressure values, the smaller the parameter is, the better the air tightness of the wheel hub is. This indicates that the qualified wheel hubs can be subjected to further quality classification according to the method of the present embodiment. This will greatly facilitate the quality-based grading of the wheel hubs, and the discriminated selling specific to the quality requirement for the wheel hubs will facilitate the increase of the average selling price of the wheel hubs. For fewer occasions in which the requirement on the air tightness of the wheel hub is extremely high, the wheel hub can be selected in a targeted way, thereby improving the safety coefficient in such occasions and bringing significant effects.

Embodiment 4: Pipelining System for Detecting Air Tightness of Aluminum Alloy Wheel Hub The system comprises the air tightness detection device for the aluminum alloy wheel hub as described in Embodiment 1, a data acquisition module 101 and a data processing module 102; wherein the data acquisition module 101 reads gas pressure measurement data from the precision air pressure sensors 3, and the data processing module 102 is connected with the data acquisition module 101 and the servo motor loading control system 13; the data processing module 102 comprises a processor and a memory and is connected with the data acquisition module; the data processing module 102 is configured to (a) read the gas pressure measurement data from the data acquisition module 101 and record the gas pressure measurement data in the memory, and (b) send an inflation or inflation stopping instruction to the servo motor loading control system 13; preferably, the system further comprises a manipulator 103 connected to the data processing module 102, with the manipulator 103 set to (a) move the wheel hub onto the cone cylinder pressure plate 5, and (b) move the wheel hub from the cone cylinder pressure plate 5 to a scrap area, or (c) move the wheel hub from the cone cylinder pressure plate 5 to a qualified product area according to the instruction sent by the data processing module 102.

In the detection method of the pressure difference method, at first, the manipulator 103 moves the wheel hub to be detected from a conveying belt to the cone cylinder pressure plate 5; the servo motor loading control system 13 controls the servo motor and reduction gear 16 to work; the loading lead screw 14 drives the upper clamp and the pressure plate 8 to move downwards to be in tight press fit with the upper surface of the wheel hub 7; the sealing process lasts for about 3 seconds. Then, the compressed air servo control and detection system 12 fills compressed air with a pressure value of 600 KPa into the sealed inner cavity of the wheel hub 7 through the air inlet pipe 11, and since more than 90% of the inner cavity of the wheel hub 7 is occupied by the cone cylinder pressure plate 5, the inflation process only lasts for 3 to 5 seconds and then can be completed. When six air pipes 6 in uniform distribution along a circumferential direction are inflated with air, the precision air pressure sensors 3 will detect the pressure values of an inner cavity of the wheel hub; at the point, if all the pressures detected by the six precision air pressure sensors 3 reach a range of 600 KPa to 599.9 KPa, the compressed air servo control and detection system 12 will stop inflation and keep the pressure value constant, and this process can be completed only in 1 to 3 seconds, and then advances to a pressure maintaining and leakage measuring stage. In the pressure maintaining and leakage measuring stage, a maintaining time is set to be 10 seconds and 20 seconds. If one precision air pressure sensor 3 detects that the pressure value exceeds the set range (the set range is 600 KPa to 599.9 KPa in case of 10 seconds of maintaining time, and 600 KPa to 599.8 KPa in case of 20 seconds of maintaining time), the wheel hub 7 can be determined to undergo leakage; or else, the wheel hub can be determined to be a qualified product. The qualified wheel hubs are moved to a qualified product conveying belt through the manipulator 103, or else, to a scrap area. Tests show that the present system can favorably complete the detection and discrimination on the air tightness of the wheel hubs.

In the detection method of the flow method, the manipulator 103 places the wheel hub 7 onto the cone cylinder pressure plate 5; the servo motor loading control system 13 controls the servo motor and reduction gear 16 to work; the loading lead screw 14 drives the upper clamp and the pressure plate 8 to move downwards to be in tight press fit with the upper surface of the wheel hub 7; the sealing process lasts for about 3 seconds. Then, the compressed air servo control and detection system 12 fills compressed air with a pressure value of 300 KPa into the sealed inner cavity of the wheel hub 7 through the air inlet pipe 11, and since more than 90% of the inner cavity of the wheel hub 7 is occupied by the cone cylinder pressure plate 5, the inflation process only lasts for 3 to 5 seconds and then can be completed. When six air pipes 6 in uniform distribution along a circumferential direction are inflated with air, the precision air pressure sensors 3 will detect the pressure vales of the inner cavity of the wheel hub; at the point, if all the pressures detected by the six precision air pressure sensors 3 reach a range of 600 KPa to 599.9 KPa, the compressed air control and detection system 12 will maintain a certain inflation flow in Pa*ml/s (e.g., the flow value of 10 Pa*ml/s) and keep the flow value constant; this process will last for 10 to 20 seconds, and then advances to a flow leakage measuring stage. The precision air pressure sensors 3 detect pressure value change quantities $\Delta P$ of corresponding areas of the inner cavity of the wheel hub and convert the pressure change quantities into flow values. Through comparison, if the flow value of an area is far less than the flow value for maintaining the constant condition (10±0.02 Pa*ml/s), the wheel hub 7 can be determined to undergo leakage; or else, the wheel hub can be determined to be qualified. The qualified wheel hubs are moved to a qualified product conveying belt by the manipulator 103, or else, to a scrap area. Tests show that the present system can favorably complete the detection and discrimination on the air tightness of the wheel hubs.

Embodiment 5: Pipelining System for Detecting Air Tightness of Aluminum Alloy Wheel Hub In the present embodiment, the differences between the configuration of the device and Embodiment 4 lie in that an included angle of 45° is formed between a center axis in which the lower clamp 4, the cone cylinder pressure plate 5, the pressure plate 8 and the guide posts 10 are located and a vertical line; the conveying belt for conveying the wheel hubs to be detected to the detection area is replaced by sucking disks hung on a guide rail; and the lower clamp 4 is capable of contracting downwards, lifting upwards and tilting; and the manipulator is eliminated.

During operation, the sucking disk sucks to the outer side of the wheel hub and moves the wheel hub to be detected onto the cone cylinder pressure plate 5 which moves to the wheel hub and sleeves the wheel hub thereon; the sucking disk releases, and the cone cylinder pressure plate 5 descends to an original position together with the wheel hub. Subsequently, whether the wheel hub is qualified is determined according to the method of Embodiment 2 or 3. For the wheel hub determined to be qualified based on a detection result, the cone cylinder pressure plate 5 ascends together with the wheel hub, and the sucking disk descends and suck to the outer side of the wheel hub again. For the wheel hub determined to be unqualified based on a detection result, the lower clamp 4 rotates and throws the wheel hub to a scrap wheel hub receiving tank.

The inventors of the present invention find that the working efficiency is greatly improved by using the pipelining system of the present embodiment. CiTiC Dicastal Co., Ltd. sets up this pipelining system in the production line during internal tests, and establishes a system with six groups of air tightness detection devices running on the same pipelining line at the same time. The system can complete the detection on one wheel hub within about 3 seconds on average, and has the daily detection capacity up to 25 thousands of wheel hubs, which can meet the requirement of a wheel hub plant with the annual yield of 5 millions of wheel hubs. If the pipelining system is applied to the manufacturing platform with the yield of 30 millions of wheel hubs of CiTiC Dicastal, considerable economic and social benefits will be brought.

The invention claimed is:

1. An airtightness detection device for an aluminum alloy wheel hub, consisting of a lower clamp, a first pressure plate, a second pressure plate, guide posts, an air inlet pipe, air pressure pipes, air pressure sensors, and a compressed-gas control and detection system, wherein
  the second pressure plate is connected to the plurality of guide posts, and the second pressure plate is made of flexible soft rubber;
  the first pressure plate is mounted on the lower clamp and has a truncated-cone portion which is suitable to match with an inner cavity of the wheel hub so that the first pressure plate and the wheel hub form a sealed chamber between them, the first pressure plate being made of flexible rubber;
  the air inlet pipe extends through an interior of the first pressure plate, and has one end which is in communication with the sealed chamber and ends on a surface of the truncated cone portion of the first pressure plate and another end which is in communication with the compressed gas control and detection system; and
  the plurality of air pressure pipes extend through the interior of the first pressure plate, and each of the plurality of air pressure pipes has one end which is in communication with the sealed chamber and ends on the surface of the truncated cone portion of the first pressure plate and another end which is in communication with the plurality of air pressure sensor for measuring pressure changed inside the sealed chamber;
  wherein the lower clamp is mounted on a base.

2. The device according to claim 1, wherein the truncated cone portion of the first pressure plate occupies 85% to 97% of the space of the inner cavity of the wheel hub.

3. The device according to claim 1, wherein the plurality of air pressure sensors and the plurality of air pressure pipes are respectively 3 to 12 in number and are uniformly distributed along a circumferential direction of the first pressure plate.

4. The device according to claim 1, wherein the second pressure plate is mounted on the plurality of guide posts via an upper clamp, and wherein the plurality of guide posts are 2 to 4 in number.

5. The device according to claim 1, wherein the compressed gas control and detection system is a flow-type or pressure-type compressed gas control and detection system, and wherein the compressed gas servo control and detection system is connected with a servo motor loading control system.

6. A system for detecting airtightness of an aluminum alloy wheel hub, comprising:
  the air tightness detection device for the aluminum alloy wheel hub as set forth in claim 1; a data acquisition module; and a data processing module; wherein
  the data acquisition module reads gas pressure measurement data from the plurality of air pressure sensors, and the data processing module is connected with the data acquisition module and a servo motor loading control system;
  the data processing module comprises a processor and a memory, and the data processing module is connected with the data acquisition module; wherein the data processing module is configured to read the gas pressure measurement data from the data acquisition module and record the gas pressure measurement data in the memory; and send an inflation or inflation stopping instruction to the servo motor loading control system;
  and further wherein the system further comprises a manipulator connected to the data processing module, the manipulator being set to move the wheel hub onto the first pressure plate, move the wheel hub from the first pressure plate to a scrap area, or move the wheel hub from the first pressure plate to a qualified product area, based on an instruction sent by the data processing module.

7. A method for detecting airtightness of an aluminum alloy wheel hub by using the device as set forth in claim 1, comprising:
  placing the wheel hub to be detected on the first pressure plate, with a spoke side of the wheel hub facing upwards, and moving the second pressure plate downwards to press a wheel disk of the wheel hub tightly to form the sealed chamber;
  filling a compressed gas into the sealed chamber via the air inlet pipe through the compressed-gas control and detection system, and detecting a gas pressure inside the sealed chamber by using the plurality of air pressure sensors until the plurality of air pressure sensors detect that the gas pressure reaches a first pressure, the first pressure being 200 to 800 kPa and an inflation time being 2 to 12 seconds;
  stopping inflation, detecting the gas pressure inside the sealed chamber through the plurality of air pressure sensors, and recording a second gas pressure after 10 to 60 seconds; and
  comparing the second gas pressure with the first gas pressure to obtain an airtightness index of the wheel hub.

8. A method for detecting airtightness of an aluminum alloy wheel hub by using the device as set forth in claim 1, comprising:
  placing the wheel hub to be detected on the first pressure plate, with a spoke side of the wheel hub facing upward, and moving the second pressure plate downwards to press a wheel disk of the wheel hub tightly to form the sealed chamber;
  filling a compressed gas into the sealed chamber via the air inlet pipe through the compressed-gas control and detection system, and detecting a gas pressure by using the plurality of air pressure sensors until the plurality of air pressure sensors detect that the gas pressure reaches a first pressure, with the first pressure being 200 to 800 kPa and an inflation time being 2 to 12 seconds;
  continuing to fill the compressed gas into the sealed chamber, detecting a gas pressure by using the air pressure sensors, and measuring a second gas pressure through the plurality of air pressure sensors at the end of this step; and
  comparing the first gas pressure with the second gas pressure to obtain an airtightness index of the wheel hub.

* * * * *